United States Patent [19]
Redmer

[11] Patent Number: 5,825,364
[45] Date of Patent: Oct. 20, 1998

[54] SYSTEM AND METHOD FOR CONSTRUCTING A THREE DIMENSIONAL MODEL FROM TWO DIMENSIONAL IMAGES USING POISSAN PROBABILITY

[75] Inventor: Ronald D. Redmer, Rochester Hills, Mich.

[73] Assignee: Electronic Data Systems Corporation, Plano, Tex.

[21] Appl. No.: 634,480

[22] Filed: Apr. 18, 1996

[51] Int. Cl.$^6$ .................................................. G06T 17/00
[52] U.S. Cl. .......................... 345/424; 345/432; 345/433
[58] Field of Search ........................... 395/124; 345/424, 345/419, 924; 364/224.5, 224.6, 578; 128/653.2, 916; 324/307, 309; 600/436, 440, 443; 378/62–68

[56] References Cited

U.S. PATENT DOCUMENTS

| | | | |
|---|---|---|---|
| 4,914,589 | 4/1990 | Crawford | 364/43.17 |
| 5,079,699 | 1/1992 | Tuy et al. | 364/413.22 |
| 5,081,993 | 1/1992 | Kitney et al. | 128/661.08 |
| 5,368,033 | 11/1994 | Moshfeghi et al. | 128/653.4 |
| 5,381,518 | 1/1995 | Drebin et al. | 345/424 |
| 5,412,764 | 5/1995 | Tanaka et al. | 345/424 |
| 5,432,447 | 7/1995 | Song | 324/309 |
| 5,485,085 | 1/1996 | Sumanaweera et al. | 324/307 |
| 5,623,586 | 4/1997 | Hohne | 345/324 |

FOREIGN PATENT DOCUMENTS 0 209 369 A3  1/1987  European Pat. Off. .
0 412 748 A2  2/1991  European Pat. Off. .

OTHER PUBLICATIONS

Song, Samuel, et al, "A least Squares based Phase Unwrapping Algorithm for MRI",*IEEE, Nuclear Science Symposium and Medical Imaging*, Apr. 1993, pp.1784–1788.
Patent Abstracts of Japan, vol. 009, No. 177 (p–375), 23 Jul. 1985, JP 60 051814 A (Akihiro Fujimura), 23 Mar. 1985.
Hamburg, Morris and Young, Peg, "Statistical Analysis for Decision Making", The Dryden Press, Harcourt Brace College Publishers, 6$^{th}$ Edition, 1994, pp. 137–147.
Lindley, Craig A., "Practical Image Processing in C", John Wiley & Sons, Inc., 1991, pp. 54–71, 185–187, 407–409, 418, 424–426.

*Primary Examiner*—Rudolph J. Buchel, Jr.
*Attorney, Agent, or Firm*—Robert W. Holland; L. Joy Griebenow

[57] ABSTRACT

A system that obtains thin slices of an object for which a three dimensional model is to be constructed. Each slice is photographed and the photographic image data input to a computer system and placed in a three dimensional array, wherein the X-Y pixel data is placed into two dimensions of the array, with each slice occupying one position of the third dimension. The data stored for each slice is called a reference plane. The array data is then processed to create at least one estimated plane between each pair of reference planes. Each estimated plane is created by determining the poisson distribution of data over a range of planes on either side of the estimated plane. Once the estimated places have been created, a z-axis plane can be created using a columnar slice at each X position within the array.

12 Claims, 6 Drawing Sheets

SYSTEM AND METHOD FOR CONSTRUCTING A THREE DIMENSIONAL MODEL FROM TWO DIMENSIONAL IMAGES USING POISSAN PROBABILITY

FIELD OF THE INVENTION

This invention relates to computer systems and more particularly to graphics modeling within such computer systems. Even more particularly, the invention relates to creating a three dimensional model from two dimensional images.

BACKGROUND OF THE INVENTION

Two dimensional images of a three dimensional object can be obtained by cutting thin slices of the three dimensional object and photographing each of the slices. For example this has been for scientific research of the human body by freezing the body of a deceased human, who had donated their body to science, then cutting thin slices of the body, and then photographing these thin slices and inputting the photographs into a computer system to build a three dimensional image of the human body.

In one model created of the human brain, each slice is mechanically positioned on a piece of glass and treated with a chemical that highlights the neural elements in the slice by turning them bright yellow. An electronic image is acquired by taking a high resolution picture of each slice using a digital frame capture camera. The images are cataloged and stored in an image data base. Each image is suitable for two dimensional analysis using commonly available image analysis tools.

The two dimensional slices are not well suited to three dimensional analysis since each image depicts a surface of a slice which is of a known width and there is a high probability that the image data is slightly skewed by the motion of the cutting process and the variance of alignment of the slices on the glass. The material between the surface photographed and the opposite surface, as well as the material destroyed by the cutting, is missing from the images.

It is thus apparent that there is a need in the art for a method or apparatus which reconstructs the material between the surface image slices. The present invention meets this and other needs in the art.

SUMMARY OF THE INVENTION

It is an aspect of the invention to build a three dimensional model from adjacent two dimensional images of a three dimensional object.

It is another aspect of the invention to construct image planes perpendicular to the two dimensional image planes to complete the three dimensional model.

A further aspect of the invention is to use a probability distribution to estimate the image planes between the two dimensional images.

A still further aspect is to use the poisson probability distribution to estimate the image planes between the two dimensional images.

The above and other aspects of the invention are accomplished in a system that obtains thin slices of an object for which a three dimensional model is to be constructed. Each slice is photographed and the photographic image data input to a computer system and placed in a three dimensional array, wherein the X-Y pixel data is placed into two dimensions of the array, with each slice occupying one position of the third dimension. The data stored for each slice is called a reference plane.

The array data is then processed to create at least one estimated plane between each pair of reference planes, and typically several estimated planes are created between each pair of reference planes. Each estimated plane is created by determining the poisson distribution of data over a range of planes on either side of the estimated plane.

Once the estimated places have been created, a z-axis plane can be created using a columnar slice at each X position within the array.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
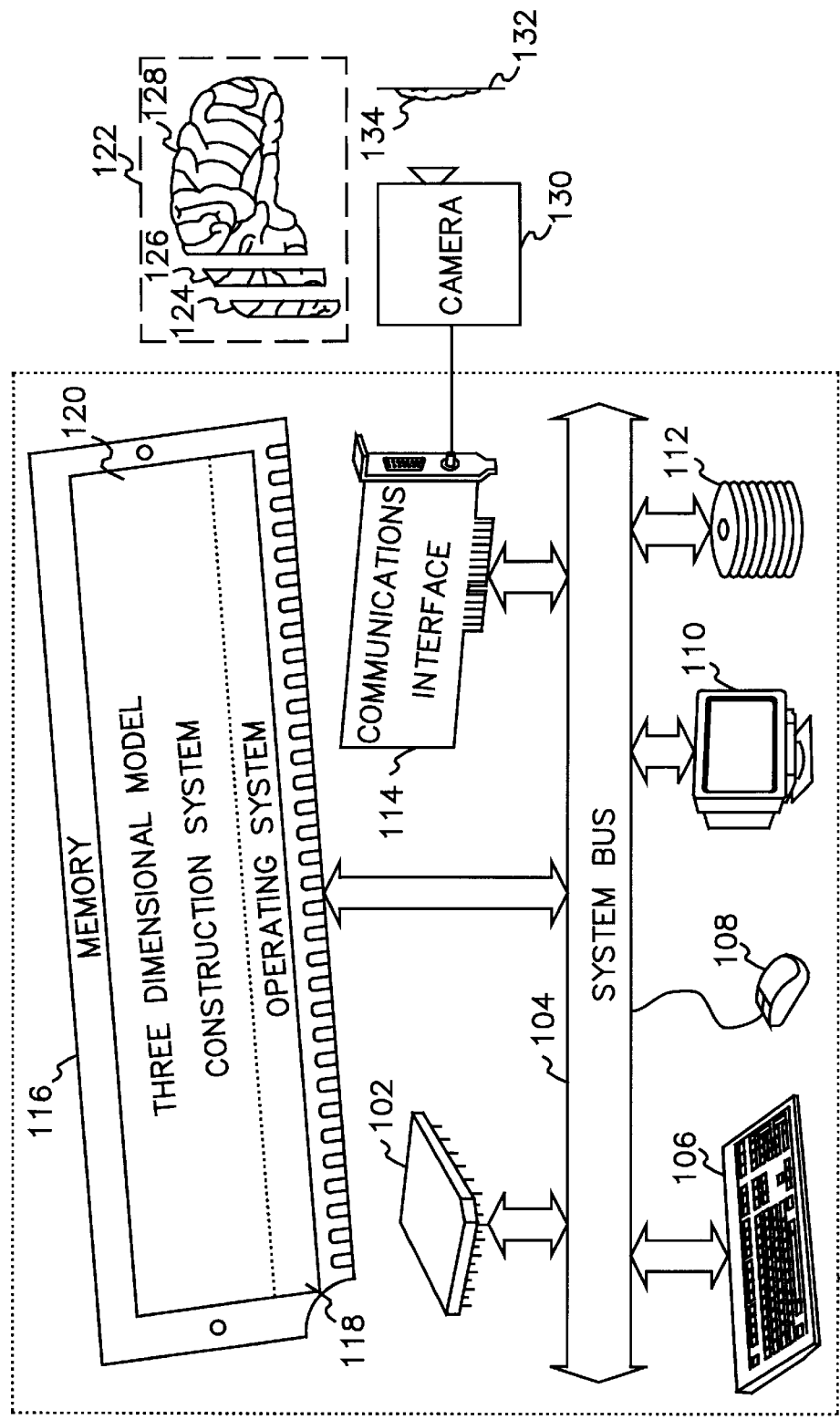
FIG. 1 shows a block diagram of the system of the invention, and illustrates scanning of a slice of an object.

FIG. 1 shows a block diagram of the system of the present invention and illustrates scanning of a slice of an object. Referring now to FIG. 1, a computer system 100 contains a processor 102 which communicates to other elements of the system 100 over a system bus 104. A keyboard 106 and a mouse device 108 allow input to the computer system 100 while a display 110 allows software within the computer system 100 to output text or graphical information to a user of the system 100. A disk 112 stores the software and data of the invention and a memory 116 contains an operating system 118, which may be any one of a number of commercially available operating systems. The memory 116 also contains the three dimensional model construction system 120 of the present invention.

A communications interface 114 allows the three dimensional model construction system 120 to communicate to a camera device 130 which takes images of slices of an object for which a three dimensional model is being constructed. As an example, a slice 134 of a brain 122 is shown against a glass plate 132. The brain 122 has been sliced into very thin slices 134, 124, 126, etc. as discussed in the background of the invention, in order to build a three dimensional model of the neural elements of the brain 122. As discussed in the background, and not part of this invention, the brain is sliced into thin slices and treated with a chemical to highlight certain sections of the brain. As each slice is placed on the glass 132, the camera 130 takes an image and that image is transmitted through the communications interface to the three-dimensional model construction system 120 and then stored in a large array, typically on the disk 112. Those skilled in the art will recognize that any object could be sliced and each slice photographed by the camera 130.

Figure 2:
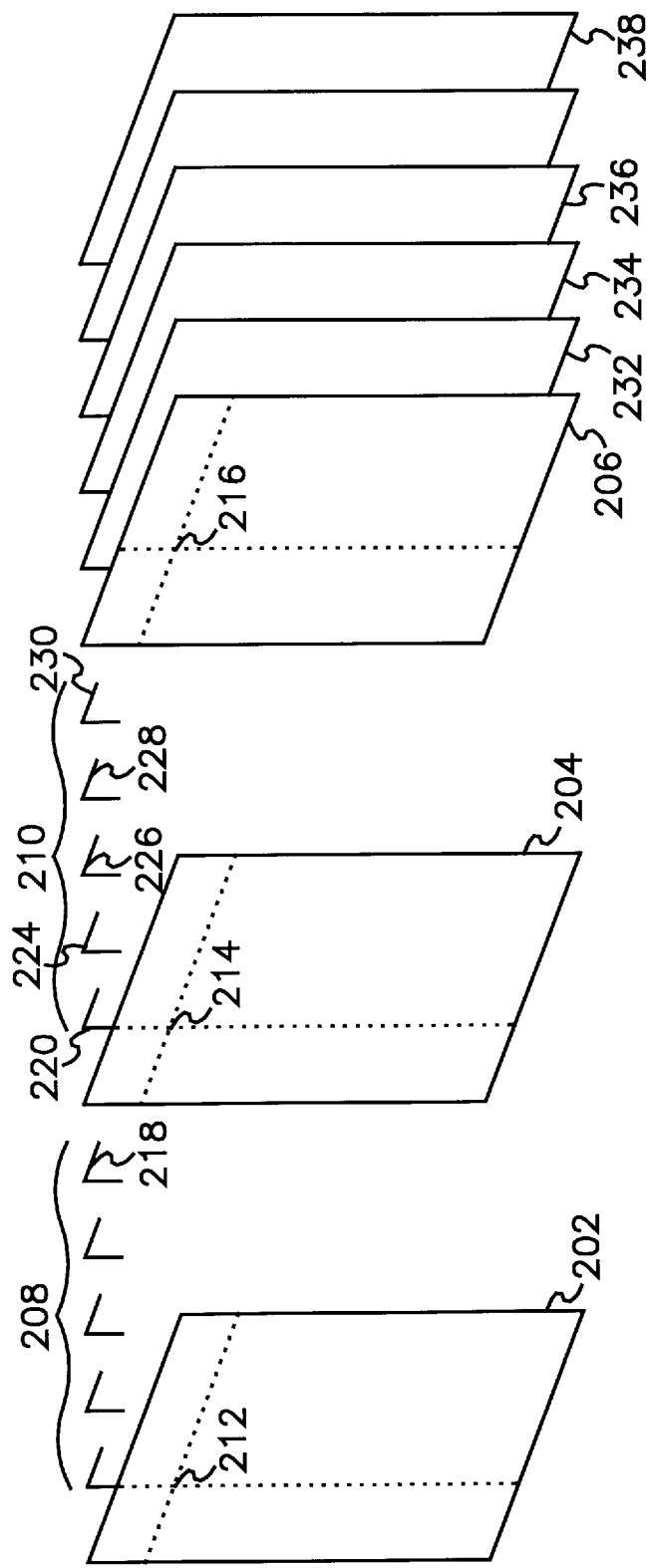
FIG. 2 shows a series of reference planes of scanned data along with the location of estimated planes between the reference planes.

FIG. 2 shows a series of reference planes of scanned data along with the location of estimated planes, constructed by the present invention, between the reference planes. The camera 130 (FIG. 1) captures two dimensional images of slices of the object being modeled, and these images are represented in FIG. 2 by the reference planes 202, 204, 206, etc., that are drawn using a four sided figure. Because of the width of the cutting blade that takes slices from the object being modeled, material will be removed from the object and this material will not be available for the camera. Thus, there are missing planes between the reference planes 202, 204, 206, etc. that must be estimated in order to form a complete three-dimensional model. These estimated planes are represented by the symbols within the areas 208 and 210, wherein the symbols within area 208 are the estimated planes that will be located between reference planes 202 and 204 and the symbols within area 210 represent the estimated planes that will be located between the reference planes 204 and 206. As will be discussed below, the present invention will create data for these estimated planes.

Figure 3:
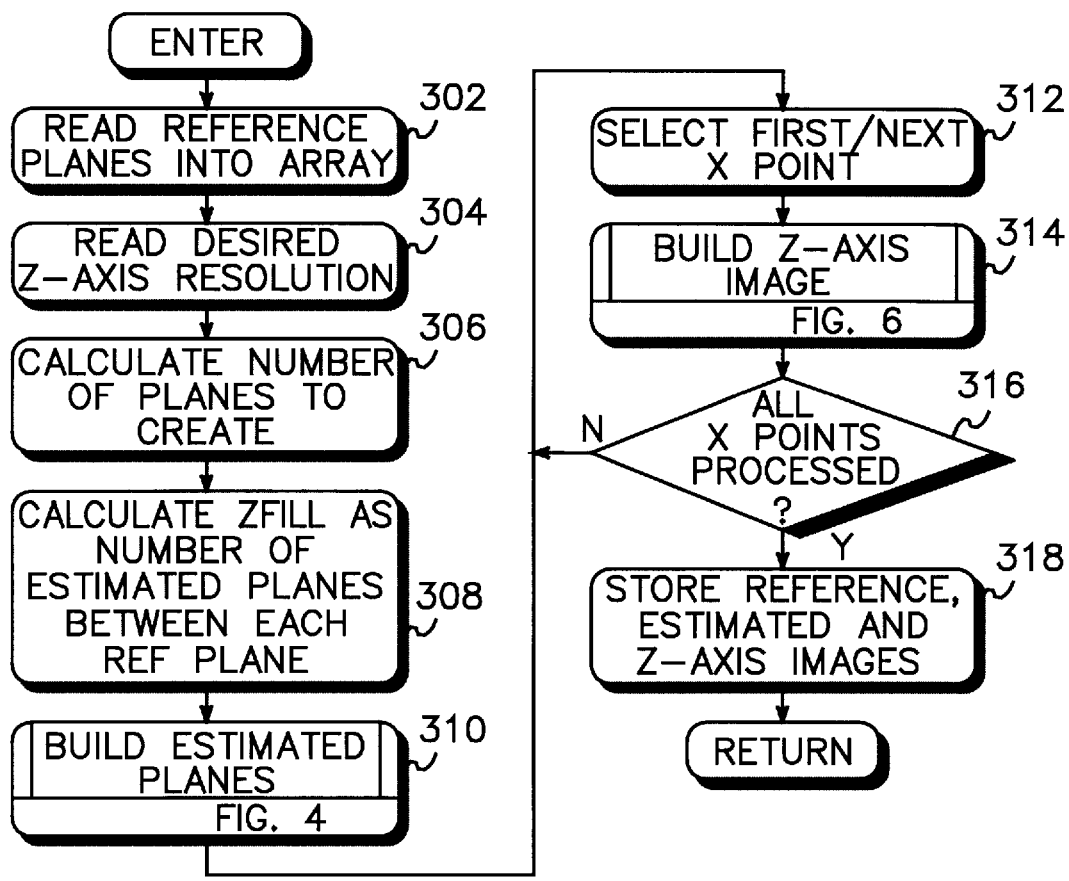
FIG. 3 shows a high level flowchart of the three dimensional model construction system 120 of FIG. 1.

FIG. 3 shows a high level flowchart of the three-dimensional model construction system 120 of FIG. 1. Referring now to FIG. 3, after entry, block 302 will read the reference plane data into an array. This data will typically have been created by the camera 130 and stored on the disk 112 by another part of the three-dimensional model construction system 120. Those skilled in the art will recognize, however, that the invention will work with reference data created in any manner.

Block 304 will then reads the desired Z axis resolution, which is input by a user of the system, and this data will determine how many estimated planes need to be created. Block 306 then calculates the number of estimated planes that need to be created by subtracting the number of reference planes from the Z axis resolution. Block 308 then calculates ZFILL as the number of estimated planes to be created between each reference plane. That is, the total number of estimated planes is divided by the number of reference planes to give the number of estimated planes that must be created between each pair of the reference planes.

Figure 4:
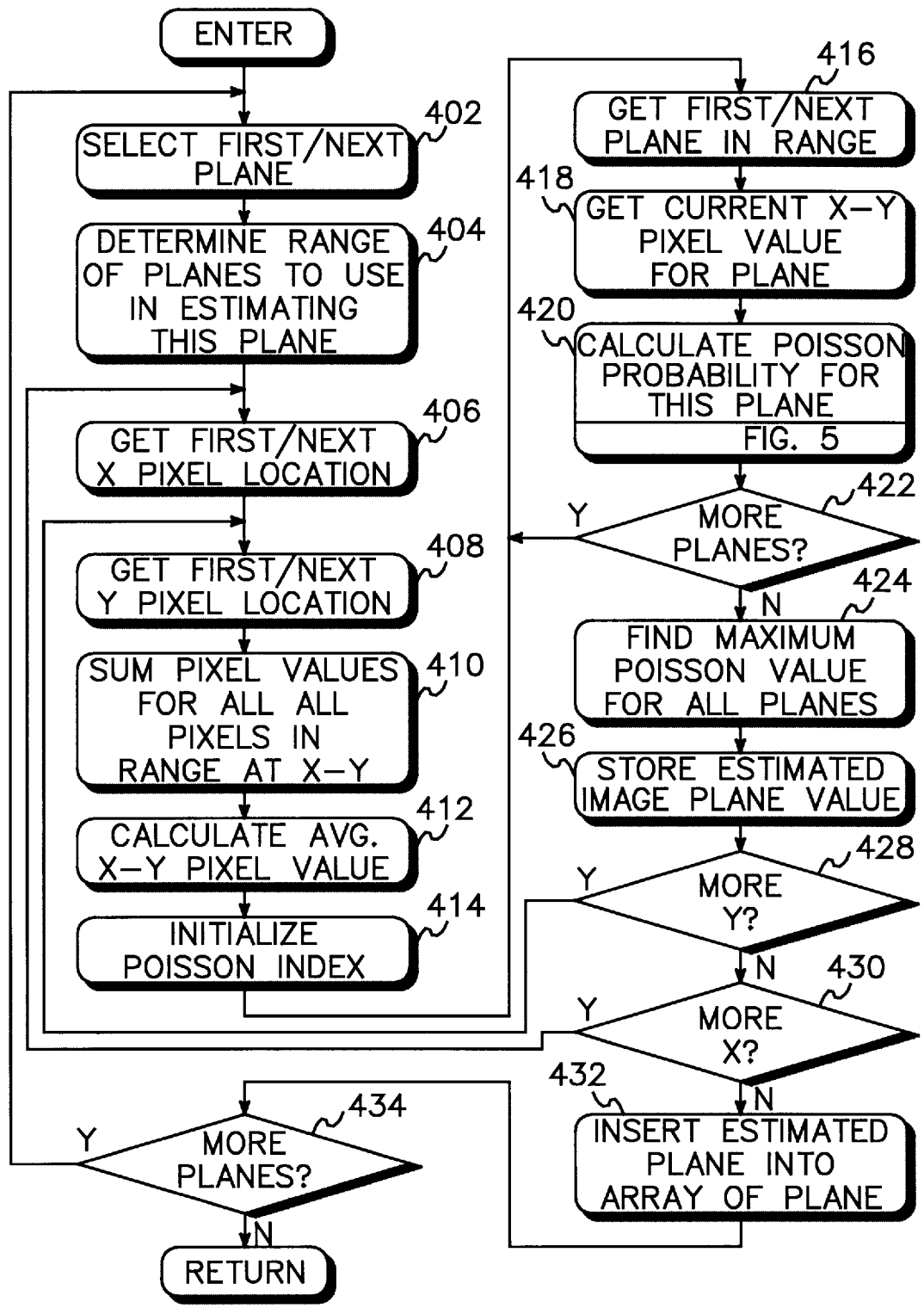
FIG. 4 shows a flowchart of the build estimated planes function of FIG. 3.

Block 310 then calls FIG. 4 to build these estimated planes. after the estimated planes have been constructed, the invention builds a z-axis image from the reference and estimated data. To build the z-axis image, block 312 selects the first or next X point (column) along the reference planes, and block 314 then calls FIG. 6 to build a Z-axis image from the reference and estimated planes along the selected column. That is, all the Z-Y points within the selected column, form a plane parallel to the Z-axis.

Block 316 then determines if all the X points have been processed and if not, returns to block 312 to build the Z-axis image for the next column along the X axis. After planes have been constructed for all columns on the X axis, block 316 goes to block 318 which stores the Z-axis images onto the disk 112.

FIG. 4 shows a flowchart of the build estimated planes function called from block 310 of FIG. 3. Referring now to FIG. 4, after entry, block 402 selects the first or next estimated plane to be built. Block 404 then determines the range of planes to use in estimating this plane. This range of planes is typically the ZFILL value constructed in block 308 of FIG. 3, however the range could also be input by a user of the system, in which case, block 404 would input the range from the user of the system. The range will include all reference and estimated planes that have already been constructed. For example, if ZFILL is three, and the reference plane 224 (FIG. 2) is being constructed, the range will include estimated planes 218 and 220, since these have already been constructed, and reference planes 204, 206, 232, and 234. Estimated planes 226, 228, and 230 will not have been constructed, so they cannot be included in the range.

Block 406 then gets the first or next X column location within the plane and block 408 then gets the next Y row location within the plane. Block 410 then sums the pixel values for all pixels within the range of planes at the X and Y location determined by blocks 406 and 408. For example, referring to FIG. 2, for the pixel location at 212, the sum of all pixels at 212, 214, and 216, etc., located within the same X-Y location of the reference planes and all estimated planes that have already been built would be summed by block 410. Block 412 then calculates the average value for these pixels. The equation for determining the sum and average value is:

$$C_\mu \left( \frac{\sum_{P(i-ZFILL)}^{P(i+ZFILL)} C(XP(x), YP(x))}{(ZFILL \cdot 2)} \right)$$

where $C_{82}$ is the average value, $P(x)$ is a plane within the range of +/- ZFILL of the current plane, and $C_{x,y}$ is an attribute of a color element at coordinate x,y. Color attributes have three component values, one each for red, green and blue, thus the equation is computed for each of the three color values.

Block 414 then initializes an index to create the poisson probability for the estimated plane at this location. Block 416 gets the first or next plane within the range determined by block 404 and block 418 gets the current X-Y pixel value for the plane selected in block 416. Block 420 then calls FIG. 5 to calculate the poisson probability for the data for the plane selected in block 416. After return from FIG. 5, block 422 determines if there are more planes yet to be processed. If so, block 422 returns to block 416 to select the next plane within the range and get the probability for its data. After all the planes within the range have been processed, block 422 goes to block 424 which finds the maximum poisson value of all the planes processed in the above loop. Block 426 then stores the maximum value determined in block 424 as the value for the estimated plane being created. Block 428 then determines if there are more rows within this column, and if so, returns to block 408 to process the next Y pixel location. After all Y locations within this column have been processed, block 428 goes to block 430 which determines whether there are more columns to be processed. If so, block 430 returns to block 406 to process the next column. After all columns and all rows have been processed, block 430 goes to block 432 which inserts the estimated plane into the array of planes. Block 434 then determines if there are more planes to be processed and if so, returns to block 402 to process the next plane. After all planes have been processed, FIG. 4 returns to FIG. 3.

Figure 5:
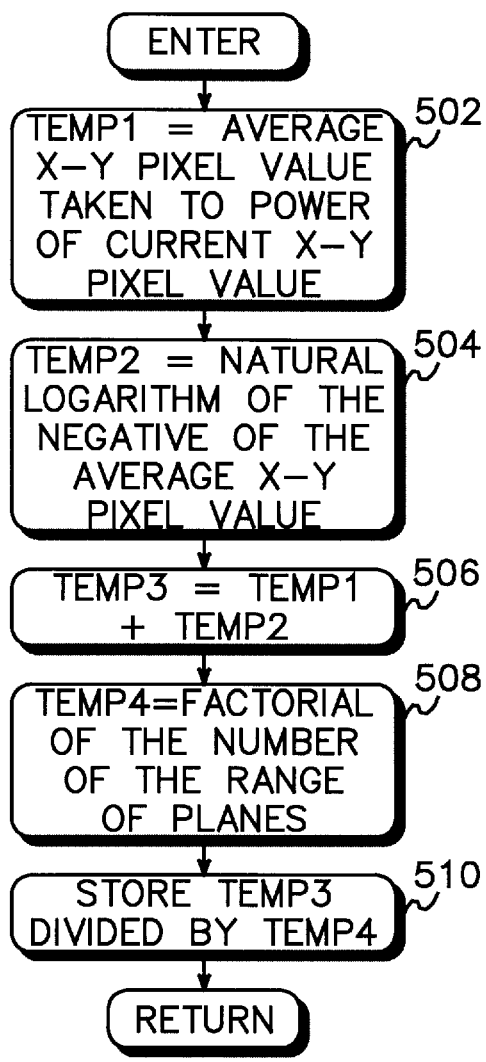
FIG. 5 shows a flowchart of the calculate poisson probability function called from FIG. 4.

FIG. 5 shows the calculate poisson probability function called from block 420 of FIG. 4. Referring to FIG. 5, after entry, block 502 takes the average pixel value determined in block 412 to the power of the current X-Y pixel value and stores the result in TEMP1. Block 504 negates the average X-Y pixel value and takes its natural logarithm, and then stores the result in TEMP2. Block 506 sums TEMP1 and TEMP2 and stores the result in TEMP3. Block 508 creates the factorial of the number of the range of planes, from block 404, and stores it is TEMP4. Block 510 divides TEMP3 by TEMP4 to produce the probability that is returned to FIG. 4. The equation for calculating the poisson probability is:

$$\left[\begin{array}{c} P(i + ZFILL) \\ P(i - ZFILL) \end{array}\right] \cdot \frac{C_\mu^{CXP(x),YP(x)} e^{-C\mu}}{ZFILL!}$$

where e is the natural logarithm.

Figure 6:
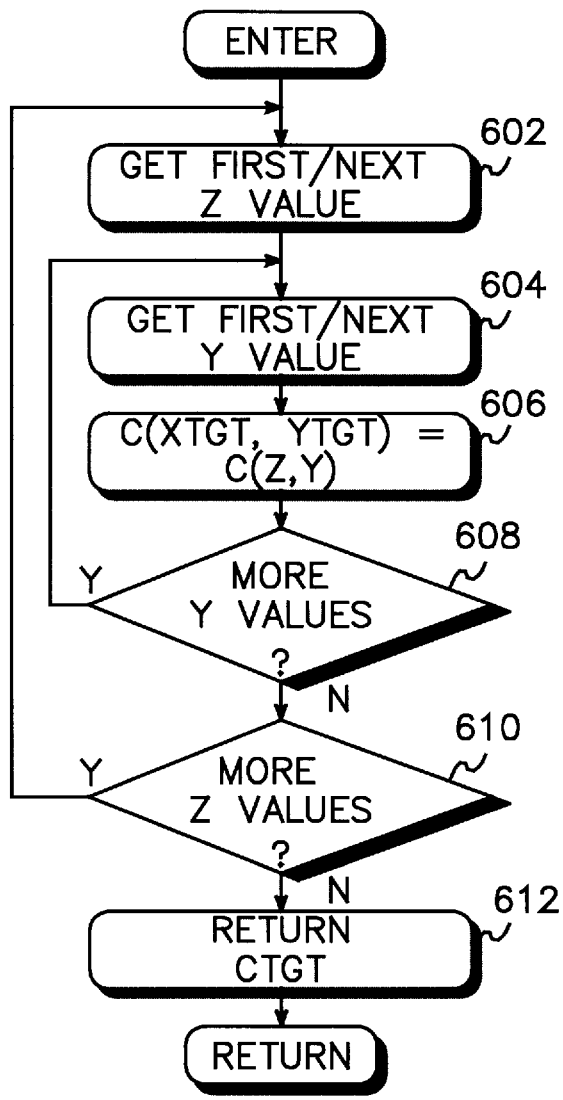
FIG. 6 shows a flowchart of the build z-axis plane function called from FIG. 3.

FIG. 6 shows a flowchart of building the z-axis image. The z-axis image is built for each column location in X by transposing x to Z. Referring to FIG. 6, after entry, block 602 gets the first or next Z location in the planes. Block 604 gets the first or next Y location, and block 606 creates the color value for the target array at the target X,Y location from the Z,Y values. Block 608 loops for all locations of Y and block 610 loops through all locations of Z. Block 612 returns the new z-axis plane to FIG. 3.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A computer system for modeling three dimensional characteristics of an object from two dimensional images of slices of the object, said system comprising:

a communication device for capturing each image of each slice;

a memory for storing each said image as a reference plane; and a processor for creating values for at least one estimate plane between each pair of reference planes, wherein said values are created from statistically estimating values from a predetermined range of planes on either side of said at least one estimated plane, the values being statistically estimated by creating a poisson probability for each plane within said predetermined range.

2. The system of claim 1 wherein said values for said at least one estimated plane comprise a maximum of the statistically estimated values for all planes within said predetermined range.

3. The system of claim 1 wherein planes within said predetermined range comprise both reference and previously estimated planes.

4. The system according to claim 1 wherein the object comprises a human body.

5. A system for modeling three dimensional characteristics of an object using slices of the object, said system comprising:

a computer system operable to receive images of the slices of an object;

the computer system further operable for storing each image of each slice as a reference plane; and wherein the computer system is further operable for creating values for at least one estimated plane between each pair of reference planes, wherein said values are created from statistically estimating values within a predetermined range of planes on either side of said at least one estimated plane, the values being statistically estimated by creating a poissan probability for each plane within said predetermined range.

6. The system of claim 5 wherein said values for said at least one estimated plane comprise a maximum of the statistically estimated values for all planes within said predetermined range.

7. The system of claim 5 wherein planes within said predetermined range comprise both reference and previously estimated planes.

8. The system according to claim 5 wherein the object comprises human brain tissue.

9. A method for modeling three dimensional characteristics of an object using slices of the object, said method comprising the steps of:

(a) imaging the slices of an object;

(b) storing each image of each slice as a reference plane; and (c) creating values for at least one estimated plane between each pair of reference planes, wherein said values are created from statistically estimating values from a predetermined range of planes on either side of said at least one estimated plane, the values being statistically estimated by creating a poissan probability for each plane within said predetermined range.

10. The method of claim 9 wherein said values for said at least one estimated plane comprise a maximum of the statistically estimated values for all planes within said predetermined range.

11. The method of claim 9 wherein planes within said predetermined range comprise both reference and previously estimated planes.

12. The method according to claim 9 wherein the object comprises a human body.

\* \* \* \* \*